United States Patent [19]
Despres et al.

[11] Patent Number: 6,029,066
[45] Date of Patent: Feb. 22, 2000

[54] COMMUNICATION PROCESS IN A TELECOMMUNICATIONS NETWORK

[75] Inventors: François Despres, Bievres; Olivier Blondeau, Rambouillet; Alain Charbonnier, Versailles, all of France

[73] Assignee: France Telecom, Paris, France

[21] Appl. No.: 08/809,470

[22] PCT Filed: Oct. 5, 1995

[86] PCT No.: PCT/FR95/01297

§ 371 Date: Mar. 27, 1997

§ 102(e) Date: Mar. 27, 1997

[87] PCT Pub. No.: WO96/11553

PCT Pub. Date: Apr. 18, 1996

[30] Foreign Application Priority Data

Oct. 6, 1994 [FR] France ................................. 94 11947

[51] Int. Cl.⁷ ........................................ H04Q 7/20
[52] U.S. Cl. ...................... 455/419; 455/414; 455/406; 455/456
[58] Field of Search .................... 455/403, 422, 455/406–408, 414, 418, 446, 456, 465, 524, 550, 558, 561, 419

[56] References Cited

U.S. PATENT DOCUMENTS

| | | | |
|---|---|---|---|
| 5,260,987 | 11/1993 | Mauger | 455/560 |
| 5,561,704 | 10/1996 | Salimando | 455/456 |
| 5,568,153 | 10/1996 | Beliveau | 342/357 |
| 5,754,955 | 5/1998 | Ekbatani | 455/422 |
| 5,758,288 | 5/1998 | Dunn et al. | 455/456 |
| 5,809,416 | 9/1998 | Pinault et al. | 455/422 |

FOREIGN PATENT DOCUMENTS

| | | |
|---|---|---|
| 0597638 | 5/1993 | European Pat. Off. . |
| 0568824 | 7/1993 | European Pat. Off. . |
| 0616457 | 2/1994 | European Pat. Off. . |
| 91-12698 | 8/1991 | WIPO . |
| 93-06685 | 4/1993 | WIPO . |
| 94-05126 | 3/1994 | WIPO . |

*Primary Examiner*—William G. Trost
*Attorney, Agent, or Firm*—Burns, Doane, Swecker & Mathis LLP

[57] ABSTRACT

A communication process in a telecommunications network between a processing member and at least one terminal (11) remote therefrom allows a subscriber equipped with a multi-user terminal or an identification module to choose at least one access area (21) to the network in which he benefits from special conditions.

12 Claims, 1 Drawing Sheet

COMMUNICATION PROCESS IN A TELECOMMUNICATIONS NETWORK

TECHNICAL FIELD

The present invention relates to a communication process in a telecommunications network.

The technical field of the invention is that of communication systems with mobiles or people GSM (registered trademark), DECT (ETSI standard), Pointel (registered trademark), DCS 1800 (system identical to the GSM system with a frequency of 1800 MHz, etc.). The field of the invention is also that of chip or memory card public telephone networks.

PRIOR ART

The invention more particularly relates to the allocation of specific access conditions (pricing, free numbers, special services, call area restriction, etc.) for public telephone networks or radio-communications with mobiles (GSM, Pointel, DECT, DCS 1800, etc.).

In a R2000 network, the rates in force are a function of the relay and time:
a red rate applies to calls on relays of the Paris region and in the national subscription framework France North East and Ile de France,
a green rate applies to other calls.

In the Itineris network, the rates in forces are a function of the time and the département where the call is made:
a first rate applies for calls made from départements 75, 92, 93 and 94 from 8 a.m. to 9.30 p.m. Monday to Friday,
a second rate applies for calls made from the metropolis outside départements 75, 92, 93 and 94 from 8 a.m. to 9.30 p.m. Monday to Friday,
a third rate applies for calls made from the metropolis from 9.30 p.m. to 8 a.m. Monday to Friday,
a fourth rate applies to calls made on Saturdays, Sundays and public holidays.

The pricing used in the SFR network is based on the same principles.

The pricing principles applied in networks nowadays are a function of the call area and the time range. In no case do they make use of an area chosen by the subscriber.

The solutions used in the Radiocom 2000 network (registered trademark) and GSM network do not make it possible to allocate specific access conditions to a subscriber. In addition, it is not possible to apply special conditions for calls made in a given area (commercial centres, business centres, etc.) and to disclose the advantages thereof to the subscriber.

Patent application EP-A-597 638 describes a cellular telephone system having mobiles, which can be displaced within cells and between the latter. Each cell has a base station. The pricing rate applicable to each mobile is a function of the area in which it is located. In a first example, each mobile can operate at a low rate when it is located in its own area or local area and at a higher rate elsewhere, whereby the local area can be formed by one or more cells. In a second example, a user pays a low rate when he is in his own local area and in certain other specified areas and a high rate elsewhere. Each base station emits an identification signal on its own channel. This signal is recognized by mobiles located in the cell of said base station and they answer indicating in return their identity to the base station. The position of each mobile (i.e. the cell in which it is located) is consequently known and this information is sent by the corresponding base station to a central control unit. Each mobile in the corresponding cell, on answering, displays to the user an identification of the cell or the corresponding area, so that the user is aware of the rate which applies. An identification of the rate can also be displayed. The area corresponding to each cell approximately corresponds to a given geographical area.

Thus, the cellular telephone system uses a centralized data base for determining the charges which are to be applied. The aim of the invention is to offer subscribers, in possession of a mobile terminal or a phonecard, specific access conditions to a telecommunications network as a function of the area from which they are sending or receiving calls, while solving the problems associated with the prior art devices.

DESCRIPTION OF THE INVENTION

The present invention proposes a communication process in a tele- communications network between a base station and at least one terminal remote therefrom, in which a subscriber to said network equipped with a terminal or an identification module when said terminal is a multi-user terminal, to choose at least one access area to the network where he benefits from special conditions, characterized in that said process comprises the following stages:
during the design of the network remote loading of the coordinates of the base station by a centralized member,
from the access area to the network chosen by the subscriber, remote loading into the terminal or identification module of cartographic coordinates permitting the association with the subscriber of said access area to the network where he will benefit from special conditions,
during an access to the network, determination by the corresponding base station whether special conditions apply to said access, by comparing its own cartographic coordinates with those stored and transmitted by the terminal.

The process according to the invention has two advantageous characteristics compared with the aforementioned EP-A-597 638:
the equipment determining the pricing to be applied can be decentralized as close as possible to the subscriber involving time and cost gains,
there is radio remote loading into the terminals of information elements (cartographic data) which will serve as application conditions (e.g. pricing).

In a first embodiment the telecommunications network is a radio-accessible network having access base stations, a base station being associated with a terminal at the time of a call.

Advantageously, the different access areas are listed on a simplified map, allocating to each access base station or each multi-user terminal elementary coordinates and/or personalized characteristics.

Advantageously, each access base station permits the local discrimination (without using more centralized equipment resources of the network), by subscriber to said network and on the basis of characteristic informations, the local calls (with respect to a nominal geographical area associated with said subscriber during the taking out of a line rental or during a specific operation following onto the same) made or received by said subscriber compared with non-local calls in order to apply differentiated pricing or access conditions.

Advantageously, each access base station discriminates by subscriber to said network and on the basis of cartographic date, the local calls (with respect to a nominal geographical area associated with said subscriber during the taking out of a line rental or during a specific operation following onto the same) made or received by said subscriber compared with non-local calls in order to apply differentiated pricing or access conditions.

In a second embodiment the telecommunications network is a multi-user terminal network, each having a physical access to a network subscriber identification module.

Advantageously, each multi-user terminal locally discriminates (without using more centralized equipment resources of the network) by subscriber to said network and on the basis of characteristic informations, the local calls (with respect to a nominal geographical area associated with said subscriber during the taking out of a line rental or during a specific operation following onto the same) made or received by said subscriber compared with non-local calls in order to apply differentiated pricing or access conditions. Advantageously, each multi-user terminal discriminates by subscriber to said network and on the basis of cartographic data, the local calls (with respect to a nominal geographic area associated with said subscriber during the taking out of a line rental or during a specific operation following onto the same) made or received by said subscriber compared with non-local calls in order to apply differentiated pricing or access conditions.

Advantageously, the terminals considered in the first embodiment can be mobile terminals. In the second embodiment the identification modules can be memory cards.

Thus, the invention permits:
the subscriber to choose one or more call areas in which he has a right to special conditions (pricing, special numbers, special services, etc.),
the user to increase his mobile clientele and increase traffic,
a tradesman to offer a special service (pricing, special numbers, etc.) in his shop, said network being based on a commercial agreement between the tradesman and the network operator.

Moreover, the use of cartographic data makes it possible to overcome problems of updating data bases in the network when base stations are added or cancelled.

DETAILED DESCRIPTION OF EMBODIMENTS

The invention, whose technical field is that of communication systems with mobiles or persons (GSM, DECT, Pointel, DCS 1800) enables a subscriber equipped with a terminal, e.g. a mobile station, or a multi-user terminal card, e.g. a public telephone, to benefit from specific conditions (pricing, call area restriction, free services or numbers, etc.) as a function of the access area to the network.

One or more so-called neighbourhood areas close to the domicile or place of work of the subscriber are chosen by the latter and other so-called commercial areas can be allocated special characteristics by a person (private individual or body corporate) for promotional purposes.

These areas are listed on a simplified map, by allocating to each access base station or each multi-user terminal elementary coordinates and sometimes personalized characteristics.

Therefore the subscriber is encouraged to use his mobile telephone or phonecard either in the areas which he has chosen, or in a commercial or attractive promotional environment.

Therefore the object of the invention is to enable the subscriber to make economies with respect to his calls, the tradesman to attract more customers and the operator to increase his "mobile" traffic.

Figure 1:
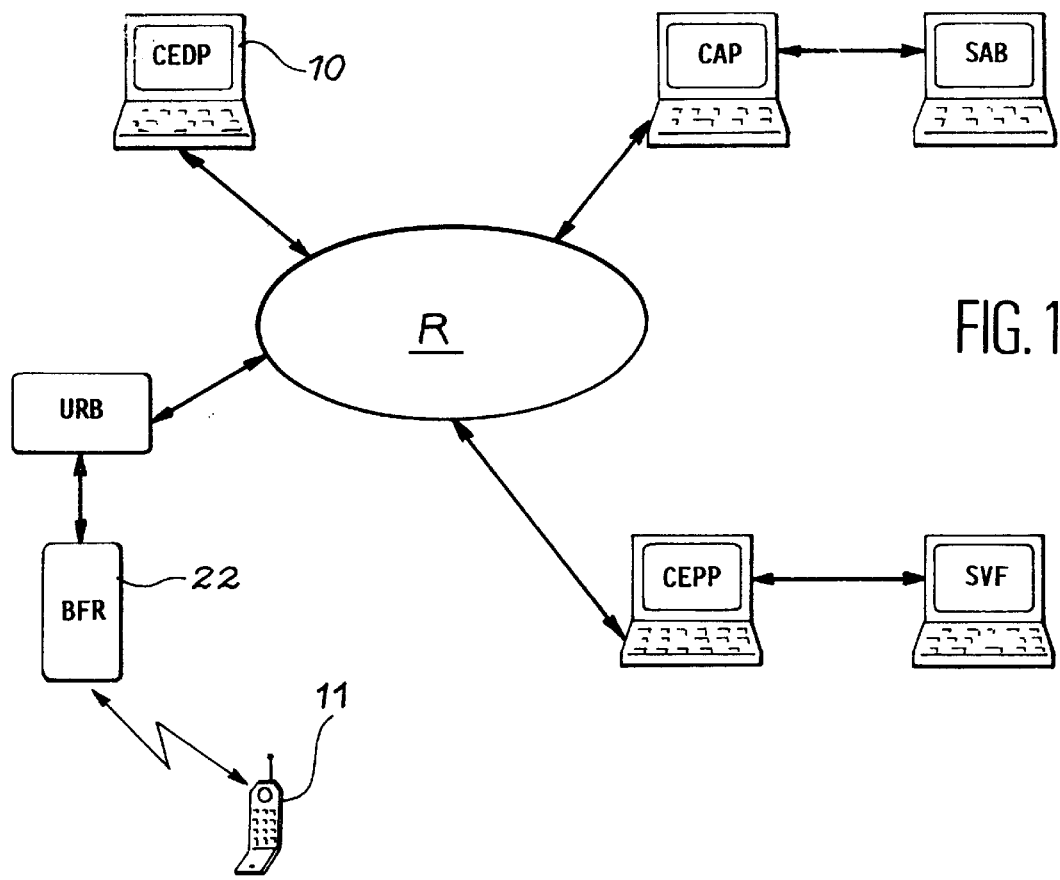
FIG. 1 illustrates a distribution of different functions within a network.
Figure 2:
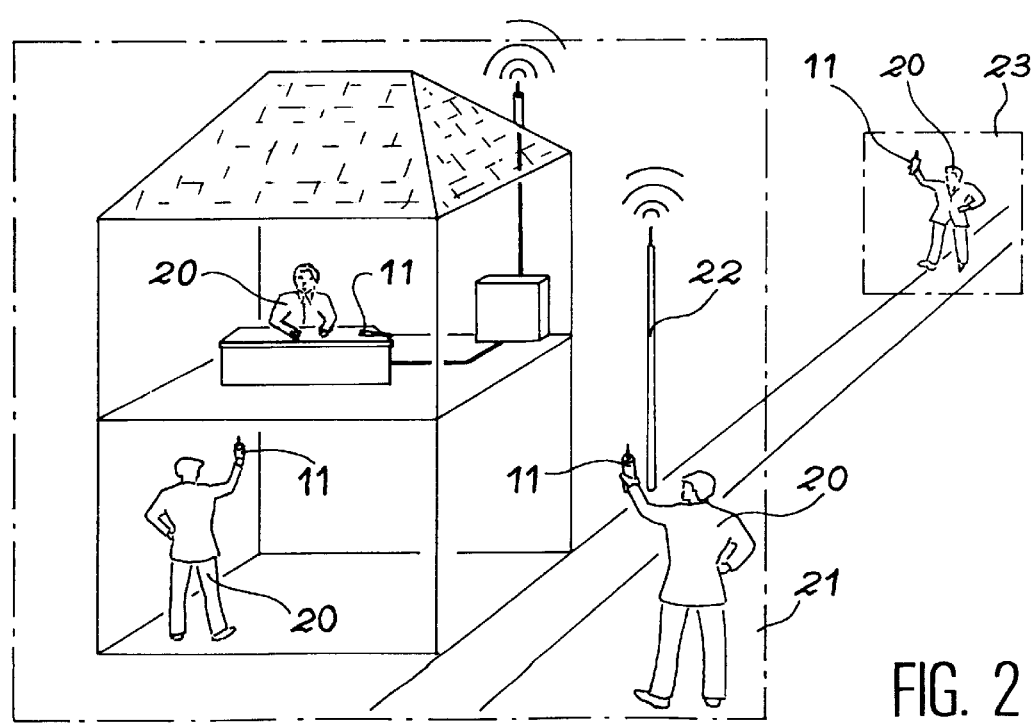
FIG. 2 illustrates a Telepoint neighbourhood service.

As shown in FIGS. 1 and 2, the invention consequently relates to a communication process in a telecommunications network between a processing member and at least one terminal 11 remote therefrom. The subscriber 20 equipped with such a terminal 11, which can be a mobile or an identification module, e.g. a chip card for access to a multi-user terminal, e.g. of the public telephone type, can choose at least one access area 21 to the network R in which he benefits from special conditions.

In a first embodiment the telecommunications network is a radio accessible network having access base stations, the latter being associated in each case with a terminal at the time of a call.

Advantageously, the different areas 23 are listed on a simplified map, in which to each base station 22 or each multi-user terminal is allocated elementary coordinates and sometimes personalized coordinates.

The processing member can be a separate member 10 or one of the access base stations or one of the multi-user terminals.

Each access base station can locally discriminate (without using more centralized equipment resources of the network) by subscriber to said network and on the basis of characteristic informations, the local calls (with respect to a nominal geographic area associated with said subscriber during the taking out of a line rental or during a specific operation following onto the same) made or received by said subscriber compared with non-local calls in order to apply differentiated pricing or access conditions.

Each call base terminal can also discriminate by subscriber to said network and on the basis of cartographic data, the local calls (with respect to a nominal geographical area associated with said subscriber during the taking out of a line rental or during a specific operation following onto the same) made or received by said subscriber compared with non-local calls in order to apply differentiated pricing or access conditions.

In a second embodiment the telecommunications network is a multi-user terminal network, each having a physical access to a network subscriber identification module.

Each multi-user terminal can locally discriminate (without using more centralized equipment resources of the network) by subscriber to said network and on the basis of characteristic informations, the local calls (with respect to a nominal geographic area associated with said subscriber during the taking out of a line rental or during a specific operation following onto the same) made or received by said subscriber compared with non-local calls in order to apply differentiated pricing or access conditions.

Each multi-user terminal can also discriminate by subscriber to said network and on the basis of cartographic data, the local calls (with respect to a nominal geographic area associated with said subscriber during the taking out of a line rental or during a specific operation following onto the same) made or received by said subscriber compared with non-local calls in order to apply differentiated pricing or access conditions.

FIG. 1 illustrates the distribution of functions within a network R. Thus, the following are wired to the network R, on this occasion the Transpac network:
a Pointel decentralized operations centre CEDP permitting the collecting of coordinates of fixed radio base stations 22 (BFR), illustrated in FIG. 2, making it possible to obtain a BFR map and the broadcasting of said coordinates, a Pointel authentication centre (CAP) permitting a checking of the remote loading rights of the coordinates, to which is connected a subscriber service (SAB) controlling subscription creation, a Pointel main operations centre (CEPP) permitting the collection of tickets, to which is connected a valorization and accounting service (SVF) permitting processing and accounting, at least one base station connection unit (URB) permitting the indication of the rate in tickets, to which is connected a fixed radio base station 22 (BFR) permitting the calculation of the distance, indication of the rate to the URB unit and the display of the rate on the CEPP centre.

A description will now be given of two embodiments of systems permitting the implementation of the process according to the invention.

FIRST EMBODIMENT

The first embodiment is an example permitting the allocation to a subscriber to the BiBop (registered trademark) network a special pricing system as a function of an area chosen by the subscriber.

Definition of the service

The aim of this service is to give a less expensive access to the BiBop network close to the domicile of the subscriber (the neighbourhood rate would be opposed to the present national rate).

A proximity zoning into small size cells, the neighbourhood Telepoint service being offered to subscribers solely on base stations covering their domicile and the immediate vicinity (apartment block, neighbouring road). This neighbourhood is defined by a distance to the domicile notion.

The putting into place of such a service requires a device enabling the subscriber to choose the area in which he wishes to benefit from reduced price charges. This area can be defined by one or more test calls made by the subscriber in the chosen proximity area.

The area chosen by the subscriber is used for routing incoming calls when the subscriber is not expressly located (habitual location principle).

Implementation constraints

The implementation and its control both with regards to the operation and the user system must be relatively simple. The subscriber must be notified on lifting the receiver of the rate (neighbourhood or national) by a voice message and/or a screen display, so that, if necessary (neighbourhood area limit), he can hang up before being charged. This service must be available even when the authentication centre CAP, shown in FIG. 1, is not connectable.

Implementation

The implementation proposed is based on a simplified map, allocating to each base station 22 (BFR) elementary coordinates permitting an easy calculation in the network of the distance between the nominal base station of the subscriber and the base station under which he is making the present call. The accuracy necessary for this cartographic tool can e.g. be roughly ten meters.

The operator, at the instant of creating a base station, collects at the Pointel decentralized operations centre CEDP, shown in FIG. 1, besides the normal characteristics, the coordinates in a cartographic system (e.g. Lambert). These coordinates are added to the operating data of the base stations sucessively transmitted from the CEDP centre to the base station connection units URB and then the URB units to their respective connection base stations. The URB unit sends to each of its base stations its Cartesian coordinates.

One or more calls must define the area chosen by the subscriber. When the area (one base station) has been chosen, the authentication centre CAP brings about, on receiving a particular number dialled by the subscriber, a remote loading of the coordinates of the base station into the hand set (cf. standard CT2 I-ETS 300 131). These coordinates are stored in the data transmission or TRD message. The coordinates of the base station can be stored in the unused part of the TRD message.

The structure of the current TRD message is as follows: each letter representing 4 bits:

| | | | | |
|---|---|---|---|---|
| AB CD EF GH | : | subscriber identification | | |
| I | : | subscription configuration | 0: | public control subscription - |
| | | | 1 or 2: | private control subscription |
| J | : | priority | 0: | non-selection subscription - |
| | | | 1: | selection subscription |
| KL MN OP QR ST | : | function of the configuration (I) | | |
| For I = 0 | | | | |
| K = 1 | : | incoming calls accepted | | |
| L = 1 | : | rapid accounting | | |
| M = 1 | : | observation | | |

A first solution consists of using the digits N to T while retaining the structure of the TRD message. An alternative is to define a new subscriber configuration I=3 and use the values L to T for the location of the base stations.

For subscribers who have subscribed to the "neighbourhood Telepoint" service (an indicator in the TRD message is positioned), the base station BFR, on each call, calculates the distance between the coordinates contained in the TRD message and the coordinates of the base station under which the call has been established.

The distance beyond which the neighbourhood rate is not granted can be contained in a BFR time delay in meters. If the distance is below this limit, the base station sends a display message on the hand set indicating to the subscriber whether or not he is in his neighbourhood area, so that, if desired, he can hang up before any charge is made. A voice message can also be sent.

When the call is ended, the base station sends a BFR base station hang-up indicating the rate used (a new field). A URB unit produces the ticket by positioning a new flag in the "ticket indicator" field enabling the accounting service to differentiate between the two types of rate.

The Lambert 2 coordinates are used by IGN (National Geographical Institute) during the complete digitization of maps of various regions of France. The unit used by these coordinates is the meter. An accuracy of approximately 10 meters would appear to be adequate for the application of "neighbourhood Telepoint". Moreover, rather than cover the entire territory of France by a single set of coordinates, it is preferable to split it up into several areas, with each of which is associated a new reference or marker. This makes it possible to operate in relative markers with smaller coordinate values. Therefore the hand set must know the coordinates of the nominal base station of the subscriber, as well as the number of the area to which the latter belongs.

Thus, q is the number of free bits in the TRD message, n the number of bits allocated to the coding of the area and p the number of bits allocated to the coding of a coordinate. France is considered to be a 1000 km square.

Knowing that an accuracy of about ten meters is necessary, the following relations are obtained:

$$\begin{cases} q = n + 2p \\ \dfrac{1000 \times 1000}{10 \times 2^n} \le 2p \end{cases} \Rightarrow p < q - \dfrac{51 ln10}{ln2} \text{ and } n = q - 2p > 0$$

Digital application with half-bytes L to T used for the location of the base stations:

q=36-2 unused bits=34 p=16 n=2

Thus, there are four areas 650 km square.

The greater the number of areas, the greater the risk of making a call under a base station close to his domicile, but outside his area (necessity in this case of calculating distances between base stations of different areas and therefore referenced in different markers). The larger the number of areas, the smaller the number of bits necessary for coding coordinates. Therefore a compromise is necessary.

The collection of the coordinates of the base stations can be carried out via a cartographic man-machine relation (RHM). If the CEDP centre is to be installed on the working station, it would be appropriate for controlling the location of the base stations to use ground data digitized via a graphical interface to be defined.

It is also possible:

to extend the cartographic interface to maintenance operation (e.g. association of a colour with the state of a base station), in the case of several operating entities to place cartographic data at all the terminals.

Summing up the necessary network evolutions

Remote loading of the coordinates of the base stations

Acquisition at the CEDP centre of the coordinates of the base stations and the adequate area.

Addition of an article to the "data transmission" message (article 5: BFR base station coordinates incorporating the area of the BFR base station coordinates). The maximum inter-base station area, on this side of which a reduced rate can be applied, is placed in a BFR time delay which the base station must know how to manage.

Collection at the SAB subscriber service of the new subscription option called "neighbourhood option".

Changes in the CAP centre-SAB service interface.

In the recording of the bases of the subscriptions of the CAP centre, addition of the neighbourhood option in the "subscription option" field and use of two high-order bits of the telepersonalization field for coding the transparent telepersonalization of the coordinates (1 bit for the request/1 bit for certification).

On the first call with the special number, the transparent telepersonalization of the coordinates of the nominal base station is initiated. As a function of the number, the base station places its coordinates in the TRD message with an adequate format and sends same to the URB unit in the "hand set authentication answer" message.

The control of the TRD message takes place at the CAP centre on the half-bytes A . . . M if I=0, on the half-bytes A . . . K if I=3 and on the half-bytes A . . . T otherwise.

Holding a call

The base station calculates the distance between itself and the nominal base station of the subscriber. A neighbourhood option (OV) flag is added to the ticket and then three cases can arise:

the area is different for the current base station and the nominal base station⇒OV=0, the area is the same, but d(inter-base station)>dmax⇒OV=0, the area is the same, but d(inter-base station)<dmax⇒OV=1, the commercial name of the service is displayed on the screen if OV=1, otherwise BI-BOP appears, a specific accounting of the "neighbourhood option" tickets is implemented at the SVF service.

Second embodiment

The second embodiment is an example permitting the allocation to a subscriber of the BiBop network specific conditions as a function of the call area of the subscriber.

Definition of the service

The aim of this service is to supply access conditions to the BiBop network as a function of the characteristics of the call area (commercial centre, business centre, etc.). A proximity zoning into small size cells is offered to all subscribers, solely on the base stations covering the area defined by the operator.

Implementation constraints

The implementation and its control with respect to operation and the user system must be relatively simple. The subscriber must be notified when removing the receiver of the rate by a voice message and/or a screen display, so that, if appropriate (neighbourhood area limit), he can hang up before being charged. This service must be available even when the CAP centre is not contactable.

Implementation

The proposed implementation is based on a broadcasting of operating data allocating to each base station (BFR) its own individual access conditions.

At the time of creating a base station, the operator collects at the CEDP centre, apart from the standard characteristics, the access conditions for calls made under said base station. The conditions are added to the operating data of the base stations successively transmitted from the CEDP centre to the URB units and then from the URB units to their respective connection base stations. The URB unit sends to each of its base stations the conditions proposed to the user.

For each call, the BFR base station indicates by a voice message and/or a written message, the conditions applied for the call to be made. When the call ends, the base station sends a BFR hang-up indicating the conditions used (a new field). The URB unit works out the ticket as a function of the access conditions.

Summing up the necessary network evolutions

Remote loading of access conditions to the base stations

Acquisition at the CEDP centre of the access conditions associated with each base station 22 (BFR).

Addition of articles in the "operating data transmission" message.

Article 6: type of rate.

Article 7: special numbers. etc.

Performing a call

The base station sends to the terminal a display indicating to it the special nature of the call and/or a voice message.

The commercial name of the service and/or tradesman is displayed on the screen.

A specific accounting of the tickets takes place at the valorization and accounting service (SVF).

GLOSSARY

CT2 : "Second Generation Cordless Telephone" (I-ETS 300 131)
CAI : "Common Air Interface"
OTAR : "Over the Air Registration"
URB : Base station connection unit
BFR : Fixed radio base station
CEDP : Pointel decentralized operations centre
CEPP : Pointel main operations centre
CAP : Pointel authentication centre
SAB : BiBop subscriber service
SVF : Valorization and accounting service
BiBop : Tradename of the Telepoint service of France Télécom in France
RHM : Man-machine relations

We claim:

1. Communication process in a telecommunications network between a base station (22) and at least one terminal (11) remote therefrom, in which a subscriber (20) to said network is equipped with a terminal (11) or an identification module when said terminal is a multi-user terminal, to choose at least one access area (21) to the network where he benefits from special conditions, characterized in that said process comprises the following stages:

during the design of the network remote loading of the coordinates of the base station (22) by a centralized member (CEDP), from the access area to the network chosen by the subscriber, remote loading into the terminal (11) or identification module, cartographic coordinates permitting the association with the subscriber of said access area to the network where he will benefit from special conditions, during an access to the network, determination by the base station (22) whether special conditions apply to said access, by comparing its own cartographic coordinates with those stored and transmitted by the terminal.

2. Process according to claim 1, characterized in that the telecommunications network is a radio-accessible network having access base stations (22), a base station being associated with a terminal at the time of a call.

3. Process according to claim 1, characterized in that the different access areas (23) are listed on a map, the map allocating to each access base station (22) or each multi-user terminal elementary coordinates permitting distance calculations within the network and/or personalized characteristics.

4. Process according to claim 2, characterized in that each access base station to the network locally discriminates, by subscriber to said network and on the basis of characteristic informations or cartographic data, the local calls made or received by said subscriber, from non-local calls in order to apply access conditions or differentiated pricing.

5. Process according to claim 1, characterized in that the telecommunications network is a network of multi-user terminals, each having a physical access to a network subscriber identification module.

6. Process according to claim 5, characterized in that each multi-user terminal locally discriminates, by subscriber to said network and on the basis of characteristic informations, the local calls made or received by said subscriber, from non-local calls in order to apply access conditions or differentiated pricing.

7. Process according to claim 5, characterized in that each multi-user terminal discriminates, by subscriber to said network and on the basis of cartographic data, the local calls made or received by said subscriber, from non-local calls in order to apply access conditions or differentiated pricing.

8. Process according to claim 1, characterized in that the terminals are mobile terminals.

9. Process according to claim 1, characterized in that the identification module is a memory or chip card.

10. Process according to claim 2, characterized in that the different access areas (23) are listed on a map, the map allocating to each access base station (22) or each multi-user terminal elementary coordinates permitting distance calculations within the network and/or personalized characteristics.

11. Process according to claim 4, characterized in that the terminals are mobile terminals.

12. Process according to claim 7, characterized in that the identification module is a memory or chip card.

* * * * *